US010351248B2

United States Patent
Palfreyman

(10) Patent No.: US 10,351,248 B2
(45) Date of Patent: Jul. 16, 2019

(54) AIRCRAFT AND AIRCRAFT WINDSHIELD HEATING SYSTEMS

(71) Applicant: Gulfstream Aerospace Corporation, Savannah, GA (US)

(72) Inventor: Gary Palfreyman, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 765 days.

(21) Appl. No.: 14/750,516

(22) Filed: Jun. 25, 2015

(65) Prior Publication Data

US 2016/0376011 A1 Dec. 29, 2016

(51) Int. Cl.
*B64D 15/12* (2006.01)
*H05B 3/84* (2006.01)
*B64C 1/14* (2006.01)
*H05B 1/02* (2006.01)

(52) U.S. Cl.
CPC ............ *B64D 15/12* (2013.01); *B64C 1/1484* (2013.01); *H05B 1/0236* (2013.01); *H05B 3/84* (2013.01); *H05B 2203/013* (2013.01)

(58) Field of Classification Search
CPC .... B64D 15/12; B64C 1/1484; H05B 1/0236; H05B 3/84; H05B 3/0042; H05B 2203/013; H05B 2203/005; H05B 2214/02
USPC ........ 219/203, 497, 494, 539, 543, 483–486
See application file for complete search history.

(56) References Cited

U.S. PATENT DOCUMENTS

| | | | | |
|---|---|---|---|---|
| 5,182,431 A * | 1/1993 | Koontz | .................... | H05B 3/84 219/203 |
| 6,114,674 A * | 9/2000 | Baugh | .................... | H01C 13/00 174/250 |
| 6,734,396 B2 * | 5/2004 | Sol | .................... | B32B 17/10036 219/203 |
| 7,388,299 B2 * | 6/2008 | Blackman | ............... | H02J 9/062 290/1 A |
| 8,378,262 B2 * | 2/2013 | Wei | .......................... | H05B 3/84 219/203 |
| 9,735,613 B2 * | 8/2017 | Orthlieb | .................... | H02J 7/35 |
| 2008/0048613 A1 * | 2/2008 | Baron | .................... | F41G 7/001 320/114 |
| 2008/0302783 A1 * | 12/2008 | Wong | ................. | G01R 31/2875 219/494 |

* cited by examiner

Primary Examiner — Mark H Paschall
(74) Attorney, Agent, or Firm — LKGlobal | Lorenz & Kopf, LLP

(57) ABSTRACT

Aircraft and aircraft windshield heating systems are provided. An aircraft windshield heating system includes a windshield, first and second heating elements, and a power bus controller. The windshield has a main portion and a reduced portion, the first and second heating elements are thermally coupled with the main portion and the reduced portion, respectively. The power bus controller is operatively coupled with the first heating element and the second heating element and is configured for coupling to a primary power supply and a backup power supply. The power bus controller is configured to determine when the primary power supply is available, to direct power from the primary power supply to the first heating element when the primary power supply is available, and to direct power from the backup power supply to the second heating element when the primary power supply is not available.

20 Claims, 3 Drawing Sheets

AIRCRAFT AND AIRCRAFT WINDSHIELD HEATING SYSTEMS

TECHNICAL FIELD

The technical field relates generally to aircraft with windshield heating systems, and more particularly relates to aircraft windshield heating systems that include a first heating element for heating a main portion of a windshield and a second heating element for heating a reduced portion of the windshield of the aircraft.

BACKGROUND

A conventional passenger aircraft typically includes heated flight deck windows. The windows are heated to provide clear visibility in all conditions. For example, fogging and ice formation may be reduced by use of such heated windows. Conventional heated windows include heating elements that extend across an entire window or segment of a window. The power requirements for heating the entire window are significant, but during normal power operations are not a burden on the aircraft power system with all power supplies functioning. The power requirements of heating the windows during emergency power operations, however, are a significant burden on the emergency power systems. For example, conventional heated windows on a business jet may require more than 6 kW to operate. Such power requirements increase the size of emergency power systems in the aircraft. Larger emergency power systems decrease usable space in the aircraft, increase weight and cost of the aircraft, and reduce fuel efficiency and range.

As such, it is desirable to provide aircraft and aircraft windshield heating systems that provide flight crew visibility during emergency power operations while reducing the power consumption of operating the windshield heating systems. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft and aircraft windshield heating systems are disclosed herein.

In a first non-limiting embodiment, an aircraft windshield heating system for use on a flight deck of an aircraft includes, but is not limited to, a windshield, a first heating element, a second heating element, and a power bus controller. The windshield has a main portion and a reduced portion, the first heating element is thermally coupled with the main portion of the windshield, and the second heating element is thermally coupled with the reduced portion of the windshield. The power bus controller is operatively coupled with the first heating element and the second heating element and is configured for coupling to a primary power supply and a backup power supply. The power bus controller is configured to determine when the primary power supply is available, to direct power from the primary power supply to the first heating element when the primary power supply is available, and to direct power from the backup power supply to the second heating element when the primary power supply is not available.

In a second non-limiting embodiment, an aircraft includes, but is not limited to, a first windshield, a first heating element, a second heating element, a primary power supply, a backup power supply, and a power bus controller. The first heating element and the second heating element are secured to the first windshield. The primary power supply is configured to provide power during normal power flight operations of the aircraft and the backup power supply is configured to provide power in response to a failure of the primary power supply. The power bus controller is operatively coupled with the first heating element, the second heating element, the primary power supply, and the backup power supply. The power bus controller is configured to direct power from the primary power supply to the first heating element and the second heating element during the normal power flight operations and to direct power from the backup power supply to the second heating element in response to the failure of the primary power supply.

BRIEF DESCRIPTION OF THE DRAWINGS

Advantages of the present invention will be readily appreciated, as the same become better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft and aircraft windshield heating systems are disclosed herein. In some embodiments, the aircraft and aircraft windshield systems include a first heating element and a second heating element. The first heating element heats a main portion of the windshield during normal power operations of the aircraft when a primary power supply is operating. The second heating element heats a reduced area portion of the windshield with the primary power supply if operational or with a backup power supply if the primary power supply is not operational. Heating the reduced area of the windshield during emergency power operation provides the flight crew a sufficient area of forward visibility for visible navigation while consuming much less power than is required to heat the entire windshield.

Figure 1:
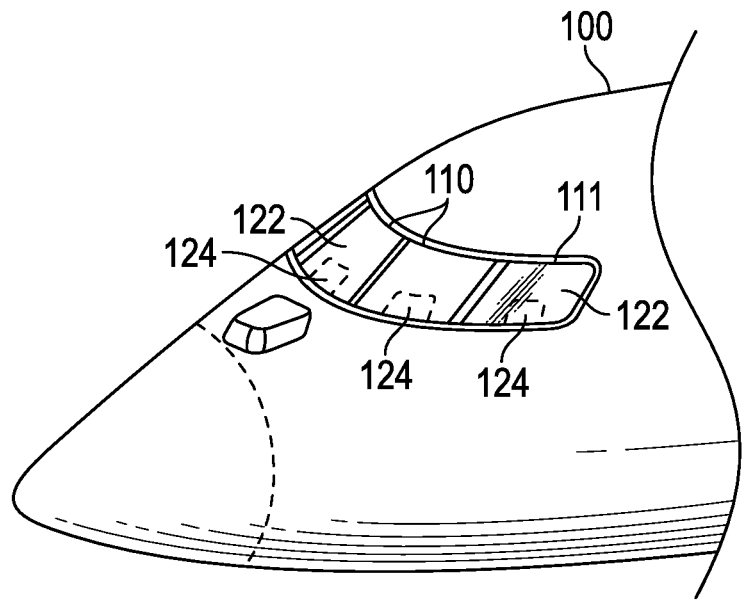
FIG. 1 is a perspective view illustrating a portion of a non-limiting embodiment of an aircraft in accordance with the teachings of the present disclosure.
Figure 2:
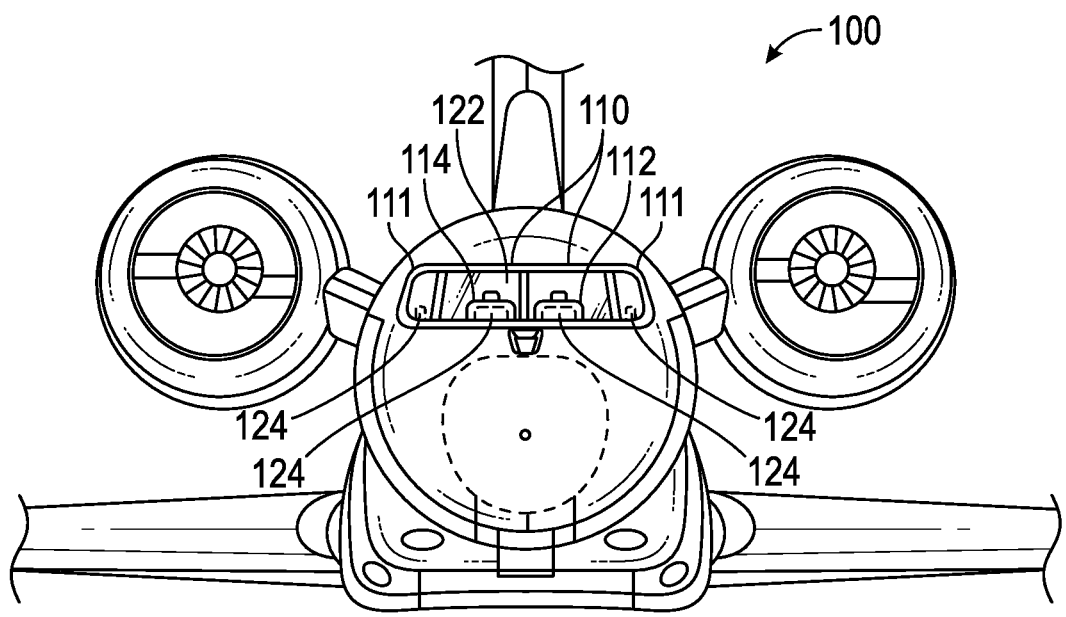
FIG. 2 is a front view illustrating the aircraft of FIG. 1 in accordance with the teachings of the present disclosure.

FIG. 1 is a perspective view and FIG. 2 is a front view, both views illustrating a non-limiting embodiment of an aircraft 100 in accordance with the teachings of the present disclosure. Aircraft 100 includes first and second front windshields 110, two side windshields 111, a first pilot seat 112, and a second pilot seat 114. Windshields 110 and 111 are formed from a transparent material, such as glass, that permits the flight crew to navigate aircraft 100 visually during some phases of flight. Windshields 110 and 111 each include a first heating element 122 and a second heating element 124.

Figure 3:
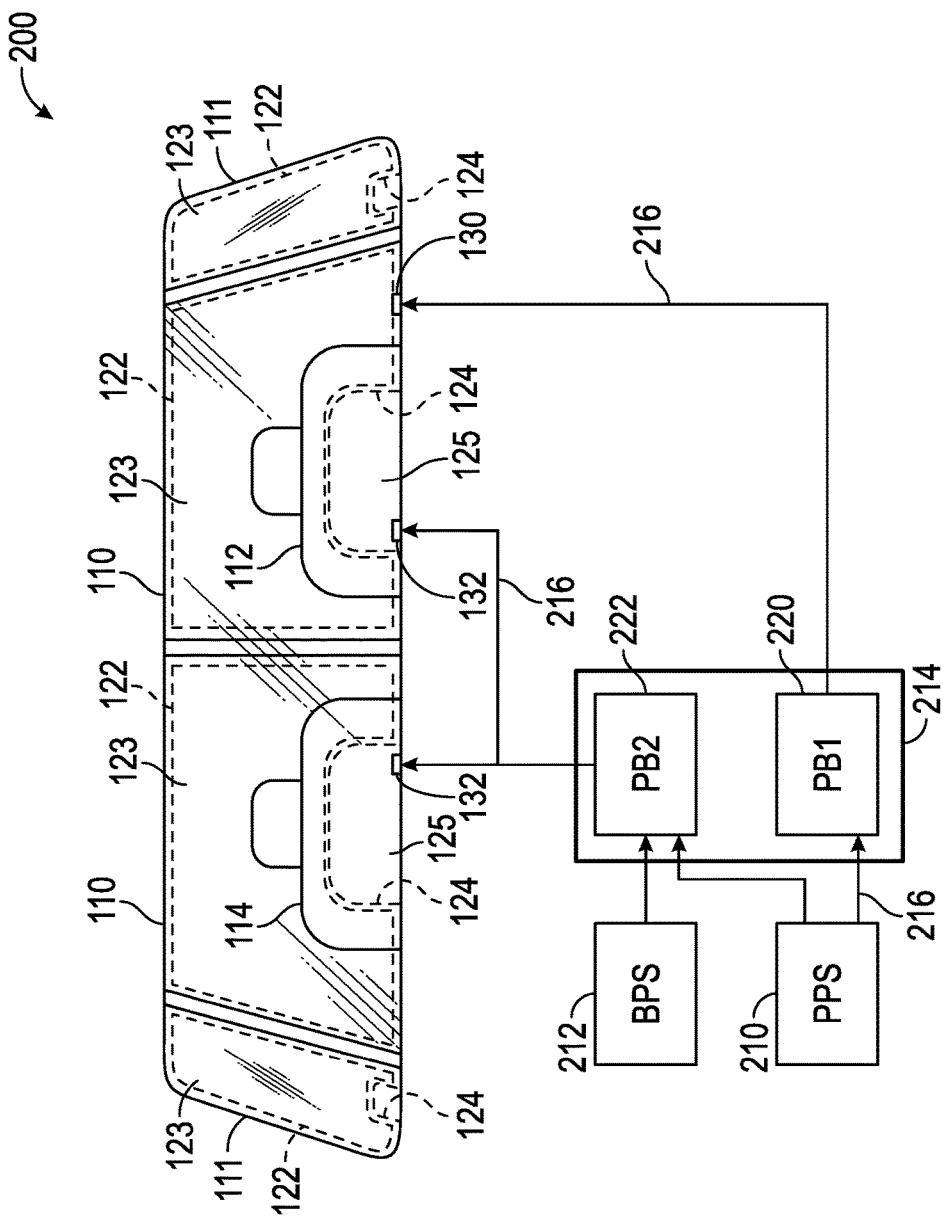
FIG. 3 is a schematic view of a non-limiting embodiment of a windshield heating system of the aircraft of FIG. 1 in accordance with the teachings of the present disclosure.

FIG. 3 is a simplified schematic view illustrating a non-limiting embodiment of an aircraft windshield heating system 200 of aircraft 100 in accordance with the teachings of the present disclosure. Aircraft windshield heating system 200 includes windshields 110 and 111, a primary power supply 210, a backup power supply 212, a power bus controller 214, and a plurality of interconnects 216.

Heating elements 122 and 124 are resistive films secured to windshields 110 and 111. Heating elements 122 and 124 resist flow of electric current to generate heat, which transfers to the windshield through conduction. Any type of resistive film known in the art may be utilized without departing from the scope of the present disclosure. In the example provided, heating elements 122 and 124 are powered by alternating current (AC) electricity. In some embodiments, heating elements 122 and 124 are powered by direct current (DC) electricity. It should be appreciated that combinations of AC and DC electricity powered heating elements 122 and 124 may be incorporated without departing from the scope of the present disclosure. In some embodiments, the resistive film is adhered to the windshields. In some embodiments, the resistive film may be integral with the transparent material forming the windshield.

First heating element 122 is thermally coupled with a main portion 123 of front windshield 110 to heat main portion 123 during normal power flight operations of the aircraft. In the embodiment provided, main portion 123 is coextensive with first heating element 122 to clear the bulk of the windshield surface area. As used herein, the term "normal power flight operations" are defined as operations during any phase of flight while at least one primary power supply is available. For example, taxi operations while any main jet engines or an auxiliary power unit are operational are normal power flight operations, as will be appreciated by those with ordinary skill in the art. In some embodiments, first heating element 122 extends across greater than about 70% of the total area of windshields 110 or 111. In some embodiments, first heating element 122 extends across about 85% to about 90% of the total area of windshields 110 or 111.

Second heating element 124 is thermally coupled with a reduced portion 125 of front windshield 110 to heat reduced portion 125 during normal power flight operations and emergency power flight operations of the aircraft. As used herein, the term "emergency power flight operations" are defined as operations during any phase of flight while no primary power supplies are available and power is provided by a backup power supply, as will be described below. Heating only reduced portion 125 during emergency power flight operations provides a clear a field of view to a pilot of the aircraft while consuming less power than is required to heat the entire windshield. In some embodiments, second heating element 124 extends across less than about 30% of the total area of windshields 110 or 111. In some embodiments, second heating element 124 extends across about 10% to about 15% of the total area of windshields 110 or 111.

For the first of the front windshields 110, second heating element 124 may be disposed substantially directly in front of first pilot seat 112 or may be located in a longitudinal center of aircraft 100. In the example provided, second heating element 124 is located at a bottom edge of windshields 110 and 111. It should be appreciated that second heating element 124 may be located in different vertical locations and have a different shape on windshields 110 and 111 without departing from the scope of the present disclosure.

The second of the front windshields 110 is substantially a mirror image of the first of the front windshields, as will be appreciated by those with ordinary skill in the art. Second heating element 124 of the second front windshield 110 may be disposed substantially directly in front of second pilot seat 114 in the cockpit. Accordingly, pilots seated in either of pilot seats 112 or 114 have a dedicated cleared window area due to heating of heating elements 124. It should be appreciated that second heating element 124 of the second front windshield 110 may be may be disposed in the lateral center of aircraft 100 without departing from the scope of the present disclosure.

First heating element 122 includes first power terminals 130 and heating element 124 includes second power terminals 132. Power terminals 130 and 132 electrically couple heating elements 122 and 124 to interconnects 216 for electrical power transfer from primary power supply 210 or backup power supply 212, as will be appreciated by those with ordinary skill in the art.

A combination of heating elements 122 and 124 is configured to clear a full field of view through the windshield during normal power flight operations of the aircraft. For example, anti-fogging and ice/snow melting capabilities of the combination during normal power flight operations are substantially similar to conventional heated windows that include a single heating element. In the example provided, the heating elements 122 and 124 do not overlap on the windshield.

Primary power supply 210 may be any power supply configured to be the main source of power to components and systems of aircraft 100 during flight. For example, primary power supply 210 may be a generator coupled with a fuel consuming component of aircraft, such as an auxiliary power unit or the main jet engines of aircraft 100. Primary power supply is coupled to heating elements 122 and 124 provide electrical power to heating elements 122 and 124 during operation of primary power supply 210.

Backup power supply (BPS) 212 may be any power supply configured to provide electric power to components and systems of aircraft 100 when primary power supply 210 ceases providing power during flight. For example, BPS 212 may be a battery bank or a ram air turbine (RAT), as will be appreciated by those with ordinary skill in the art. BPS 212 generally does not provide electric power to components of aircraft 100 while primary power supply 210 is operating. Backup power supply 212 is coupled to second heating element 124 to provide electrical power to second heating 224 in response to a failure of primary power supply 210.

Power bus controller 214 may be any device configured to selectively power heating elements 122 and 124 with power supply 210 or 212 based on the operational status of primary power supply 210. In some embodiments, power bus controller 214 is an electronic power bus controller embodied in a hardware device that carries out instructions of a computer program. For example, the instructions may cause various relays and switches in aircraft 100 to couple or decouple various components of aircraft 100 to or from power supplies 210 or 212. In the example provided, power bus controller 214 includes a first electronic power bus 220 and a second electronic power bus 222 that perform the operations of FIG. 4.

Power bus controller 214 may be implemented with one or more central processing units ("CPUs"), a microprocessor, an application specific integrated circuit ("ASIC"), a microcontroller, and/or other suitable device. Power bus controller 214 includes one or more memory units that store electronic data and computer programs. For example, the memory units may be flash memory, spin-transfer torque random access memory (STT-RAM), magnetic memory, phase-change memory (PCM), dynamic random access memory (DRAM), or other suitable electronic storage media. In the example provided, the memory units store control logic with instructions that cooperate with a processor of power bus controller 214 to perform operations of the method described below. Furthermore, power bus controller 214 may utilize multiple hardware devices as is also appreciated by those skilled in the art. In some embodiments, multiple power bus controllers may be utilized for redundancy. For example, one power bus controller may control the left front and right side, while another controller may control the right front and left side.

In some embodiments with direct current powered heating elements 122 and 124, the power bus controller is implemented with diodes. The diodes are configured to permit power flow from primary power supply 210 to heating elements 122 and 124 while primary power supply 210 is operational. When primary power supply 210 is not operational, the diodes restrict power flow from BPS 212 to heating element 122, but permit power flow from BPS 212 to heating element 124.

In some embodiments, power bus controller 214 is configured to execute a computer program to perform the algorithm described by the operations described in FIG. 4 and the paragraphs below. In some embodiments, power bus controller 214 is utilized on a standalone device coupled to an Integrated Modular Avionics system, as will be appreciated by those with ordinary skill in the art. Interconnects 216 facilitate power transfer between the various components of windshield heating system 200. For example, interconnects 216 may be insulated copper wires.

Figure 4:
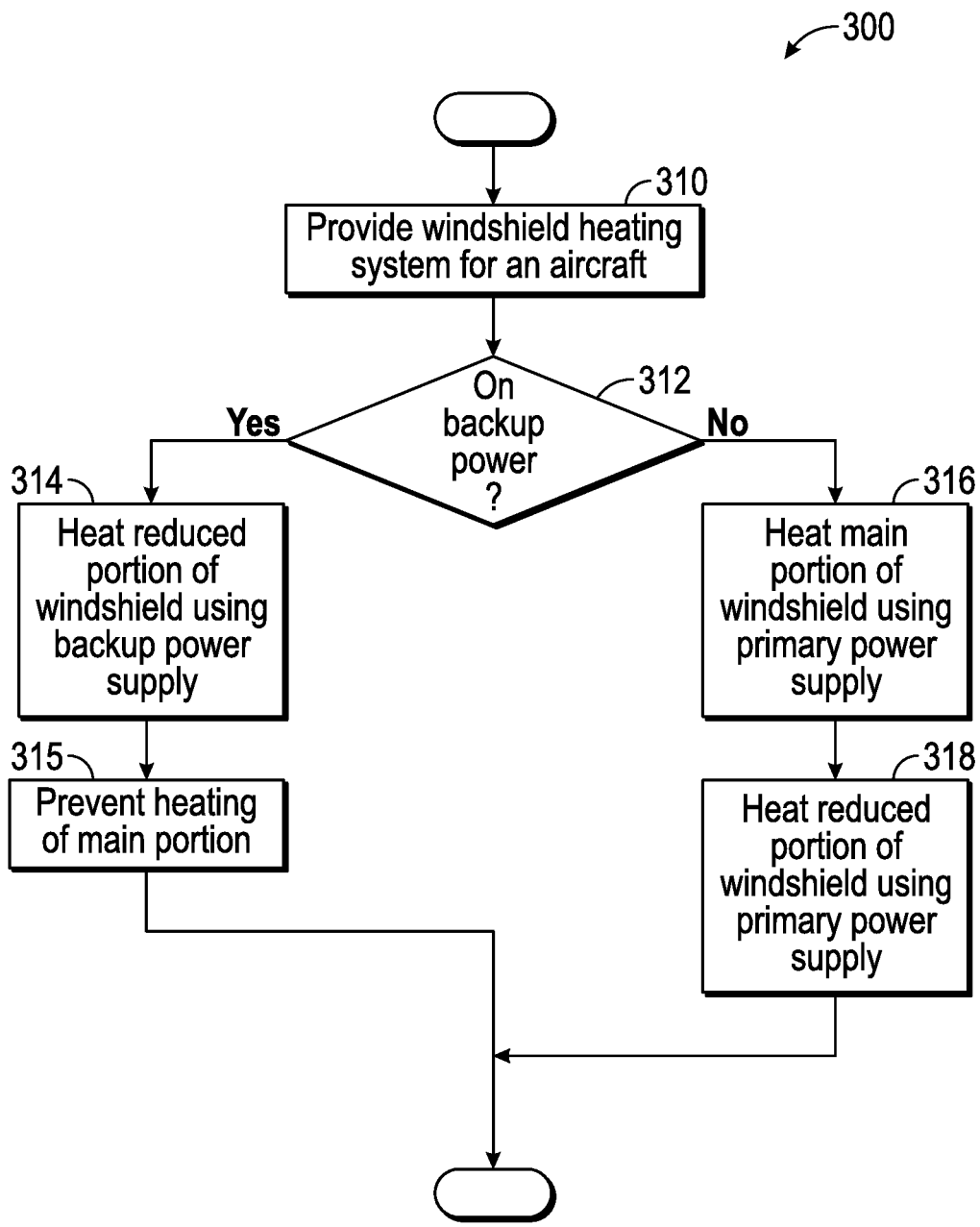
FIG. 4 is a flow diagram illustrating a non-limiting embodiment of a method of heating a windshield in accordance with the teachings of the present disclosure.

FIG. 4 is a flow diagram illustrating a non-limiting embodiment of a method 300 of heating a windshield. With continuing reference to FIGS. 1-3, operations of method 300 are performed by aircraft 100. In the example provided, some operations of method 300 are performed by power bus controller 214. A windshield heating system is provided in operation 310. For example, aircraft windshield heating system 200 may be provided. It should be appreciated that operations of method 300 may be performed for any of windshields 110 or 111 without departing from the scope of the present disclosure.

Power bus controller 214 determines whether aircraft 100 is on backup power in operation 312. For example, power bus controller 214 may determine that aircraft 100 is on backup power when primary power supply 210 is not operational during flight. When aircraft 100 is operating on backup power, power bus controller 214 heats a reduced portion of a windshield of the windshield heating system with a backup power source. For example, second electronic power bus 222 may provide power from backup power supply 212 to heating elements 124 of aircraft windshield heating system 200 when primary power supply 210 is not providing power during flight. Second electronic power bus 222 further prevents heating of a main portion of the windshield during emergency power operations in operation 315. For example, second electronic power bus 222 may restrict power transfer from backup power supply 212 to first heating element 122 to prevent heating of main portion 123.

When a primary power source is operational and the aircraft is not operating on backup power, the aircraft heats the main portion of the windshield with the primary power supply in operation 316. The aircraft further heats the reduced portion of the windshield with the primary power supply in operation 318. For example, when primary power supply 210 is operating, first electronic power bus will relay power from primary power supply 210 to first power terminals 130 of first heating element 122 and second electronic power bus 222 will relay power from primary power supply 210 to second power terminals 132 of second heating element 124.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft windshield heating system for use on a flight deck of an aircraft, the aircraft windshield heating system comprising:
a windshield having a main portion and a reduced portion;
a first heating element thermally coupled with the main portion of the windshield;
a second heating element thermally coupled with the reduced portion of the windshield; and
a power bus controller operatively coupled with the first heating element and the second heating element and configured for coupling to a primary power supply and a backup power supply, the power bus controller configured to determine when the primary power supply is available, to direct power from the primary power supply to the first heating element when the primary power supply is available and to direct power from the backup power supply to the second heating element and restrict power transfer to the first heating element when the primary power supply is not available.

2. The aircraft windshield heating system of claim 1, wherein the second heating element is arranged on the windshield to be disposed substantially directly in front of a first pilot seat in the flight deck when installed on the aircraft.

3. The aircraft windshield heating system of claim 1, wherein the first heating element extends across greater than about 70% of the windshield, and wherein the second heating element extends across less than about 30% of the windshield.

4. The aircraft windshield heating system of claim 1, wherein the power bus controller is configured to direct power from the primary power supply to both the first heating element and the second heating element when the primary power supply is available.

5. The aircraft windshield heating system of claim 4, wherein the windshield is a first windshield, the aircraft windshield heating system further comprising a second windshield having a first heating element and a second heating element, and wherein the power bus controller is further configured to direct power from the primary power supply to the first and second heating elements of the second windshield when the primary power supply is available and to direct power from the backup power supply to the second heating element of the second windshield when the primary power supply is not available.

6. The aircraft windshield heating system of claim 5, wherein the second heating element of the second windshield is arranged on the second windshield to be disposed substantially directly in front of a second pilot seat in the flight deck when the aircraft windshield heating system is installed on the aircraft.

7. The aircraft windshield heating system of claim 5, wherein the power bus controller includes a first electronic power bus coupled with the primary power supply and the first heating elements of the first and second windshields, wherein the first electronic power bus is configured to transfer power from the primary power supply to the first heating elements of the first and second windshields when the primary power supply is available during normal power flight operations of the aircraft.

8. The aircraft windshield heating system of claim 5, wherein the power bus controller further includes a second electronic power bus coupled with the primary power supply, the backup power supply, and the second heating element, wherein the second electronic power bus is configured to transfer power from the primary power supply to the first heating elements and the second heating elements of the first and second windshields when the primary power supply is available during normal power flight operations and to transfer power from the backup power supply to the second heating elements of the first and second windshields when the primary power supply is not available during emergency power flight operations of the aircraft.

9. The aircraft windshield heating system of claim 1, wherein the first heating element and the second heating element do not overlap on the windshield.

10. An aircraft, comprising:
a first windshield having a main portion and a reduced portion;
a first heating element thermally coupled to the main portion of the first windshield;
a second heating element thermally coupled with the reduced portion of the first windshield;
a primary power supply configured to provide power during normal power flight operations of the aircraft;
a backup power supply configured to provide power in response to a failure of the primary power supply; and
a power bus controller operatively coupled with the first heating element, the second heating element, the primary power supply, and the backup power supply, wherein the power bus controller is configured to direct power from the primary power supply to the first heating element and the second heating element during the normal power flight operations and to direct power from the backup power supply to the second heating element and restrict power transfer to the first heating element in response to the failure of the primary power supply.

11. The aircraft of claim 10, further comprising a flight deck having a first pilot seat, and wherein the second heating element is disposed substantially directly in front of the first pilot seat.

12. The aircraft of claim 10, wherein the second heating element extends across about 10% to about 15% of a total area of the first windshield.

13. The aircraft of claim 12, wherein the first heating element extends across about 85% to about 90% of the total area of the first windshield.

14. The aircraft of claim 10, wherein the first windshield is a first front windshield.

15. The aircraft of claim 14, further comprising a second front windshield and a flight deck having a first pilot seat and a second pilot seat,
wherein the first front windshield is disposed substantially directly in front of the first pilot seat, and
wherein the second front windshield is disposed substantially directly in front of the second pilot seat.

16. The aircraft of claim 15, wherein the power bus controller is further operatively coupled to the second heating element of the second front windshield and is further configured to direct power from the backup power supply to the second heating element of the second front windshield in response to the failure of the primary power supply.

17. The aircraft of claim 14, further comprising a side windshield, wherein the side windshield includes a first heating element and a second heating element, and wherein the power bus controller is further operatively coupled with the first heating element and the second heating element of the side windshield and is further configured to direct power from the primary power supply to the first heating element and the second heating element of the side windshield during the normal power flight operations of the aircraft, and wherein the power bus controller is further configured to direct power from the backup power supply to the second heating element of the side windshield in response to the failure of the primary power supply.

18. The aircraft of claim 10, wherein the power bus controller further includes a first electronic power bus coupled with the primary power supply and the first heating element, wherein the first electronic power bus is configured to transfer power from the primary power supply to the first heating element during the normal power flight operations of the aircraft.

19. The aircraft of claim 18, wherein the power bus controller further includes a second electronic power bus coupled with the primary power supply, the backup power supply, and the second heating element, wherein the second electronic power bus is configured to transfer power from the primary power supply to the first heating element and the second heating element during the normal power flight operations and to transfer power from the backup power supply to the second heating element during emergency power flight operations of the aircraft.

20. The aircraft of claim 10, wherein the first heating element and the second heating element do not overlap on the first windshield.

* * * * *